United States Patent
Adler et al.

(10) Patent No.: US 12,395,923 B2
(45) Date of Patent: Aug. 19, 2025

(54) PACKET RECOVERY IN AN ADVERTISEMENT SYSTEM

(71) Applicant: GM GLOBAL TECHNOLOGY OPERATIONS LLC, Detroit, MI (US)

(72) Inventors: Aaron Adler, Rochester Hills, MI (US); Baljeet S. Gill, Stouffville (CA)

(73) Assignee: GM Global Technology Operations LLC, Detroit, MI (US)

( * ) Notice: Subject to any disclaimer, the term of this patent is extended or adjusted under 35 U.S.C. 154(b) by 356 days.

(21) Appl. No.: 18/320,299

(22) Filed: May 19, 2023

(65) Prior Publication Data

US 2024/0389000 A1   Nov. 21, 2024

(51) Int. Cl.
*H04W 48/10*  (2009.01)
*H04L 1/1809*  (2023.01)
*H04W 48/16*  (2009.01)

(52) U.S. Cl.
CPC ........... *H04W 48/10* (2013.01); *H04L 1/1809* (2013.01); *H04W 48/16* (2013.01)

(58) Field of Classification Search
None
See application file for complete search history.

(56) References Cited

U.S. PATENT DOCUMENTS

| 2022/0200716 A1* | 6/2022 | Bonde | H04L 1/1838 |
| 2023/0005492 A1* | 1/2023 | Abildgren | H04L 1/08 |

* cited by examiner

*Primary Examiner* — Robert M Morlan
(74) *Attorney, Agent, or Firm* — Quinn IP Law

(57) ABSTRACT

An advertisement system includes a tuner, an error detection and correction circuit, a decoder, and an output device. The tuner is operational to listen on a first channel of a plurality of channels for a first received packet during a current scan window. The error detection and correction circuit is operational to command the tuner to listen on a second channel of the plurality of channels within the current scan window for a second received packet in response to (i) an incomplete reception of the first received packet or (ii) the first received packet having uncorrectable errors, and correct the first received packet to create a first advertisement packet in response to the first received packet being received and correctable. The decoder is operational to decode the first advertisement packet to generate first advertisement information. The output device is operational to present the first advertisement information as first advertisement data.

20 Claims, 4 Drawing Sheets

PACKET RECOVERY IN AN ADVERTISEMENT SYSTEM

INTRODUCTION

The present disclosure relates to a system and a method for packet recovery in an advertisement receiver.

Current Bluetooth Low Energy systems allow a single Bluetooth advertisement packet to be processed in a respective advertising interval. If a current packet is corrupted beyond recovery, the advertisement data carried in the packet is lost until repeated in a later advertising interval. Other advertisement packets available during the current advertising interval are ignored.

Accordingly, those skilled in the art continue with research and development efforts in the field of packet recovery in an advertisement system where an advertisement packet is corrupted or missing during a current scan window.

SUMMARY

An advertisement system is provided herein. The advertisement system includes a tuner, an error detection and correction circuit, a decoder, and an output device. The tuner is operational to listen on a first channel of a plurality of channels for a first received packet during a current scan window. The error detection and correction circuit is operational to command the tuner to listen on a second channel of the plurality of channels within the current scan window for a second received packet in response to an incomplete reception of the first received packet, command the tuner to listen on the second channel within the current scan window for the second received packet in response to the first received packet having uncorrectable errors, and correct the first received packet to create a first advertisement packet in response to the first received packet being received and correctable. The decoder is operational to decode the first advertisement packet to generate first advertisement information. The output device is operational to present the first advertisement information as first advertisement data.

In one or more embodiments of the advertisement system, the error detection and correction circuit is further operational to command the tuner to listen on a third channel of the plurality of channels within the current scan window for a third received packet in response to an incomplete reception of the second received packet, and command the tuner to listen on the third channel within the current scan window for the third received packet in response to the second received packet having uncorrectable errors.

In one or more embodiments of the advertisement system, the error detection and correction circuit is further operational to correct the second received packet to create a second advertisement packet in response to the second received packet being received and correctable. The decoder is further operational to decode the second advertisement packet to generate second advertisement information. The output device is further operational to present the second advertisement information as second advertisement data.

In one or more embodiments of the advertisement system, the error detection and correction circuit is further operational to correct the third received packet to create a third advertisement packet in response to the third received packet being received and correctable. The decoder is further operational to decode the third advertisement packet to generate third advertisement information. The output device is further operational to present the third advertisement information as third advertisement data.

In one or more embodiments of the advertisement system, the tuner is further operational to listen to the first channel of the plurality of channels in a later scan window in response to the first received packet being unusable in the current scan window.

In one or more embodiments of the advertisement system, the tuner is further operational to listen to the second channel of the plurality of channels in a next scan window in response to the first received packet being decoded during the current scan window.

In one or more embodiments of the advertisement system, the tuner is further operational to listen to the second channel of the plurality of channels in a next scan window in response to the second received packet being decoded in the current scan window.

In one or more embodiments of the advertisement system, in no greater than 500 microseconds after the tuner finishes reception of the first received packet the error detection and correction circuit determines that the first received packet is uncorrectable, the error detection and correction circuit commands the tuner to switch to the second channel, and the tuner switches to the second channel to listen for a start of the second received packet within the current scan window.

In one or more embodiments of the advertisement system, the first received packet and the second received packet are Bluetooth Low Energy packets.

In one or more embodiments, the advertisement system includes an antenna coupled to the tuner and operational to receive a plurality of received packets. The antenna, the tuner, the error detection and correction circuit, the decoder, and the output device form part of a vehicle.

A method for packet recovery in an advertisement system is provided herein. The method includes listening with a tuner on a first channel of a plurality of channels for a first received packet during a current scan window, commanding the tuner to listen on a second channel of the plurality of channels within the current scan window for a second received packet in response to an incomplete reception of the first received packet, commanding the tuner to listen on the second channel within the current scan window for the second received packet in response to the first received packet having uncorrectable errors; correcting the first received packet to create a first advertisement packet in response to the first received packet being received and correctable, decoding the first advertisement packet to generate first advertisement information, and presenting the first advertisement information as first advertisement data.

In one or more embodiments, the method includes commanding the tuner to listen on a third channel of the plurality of channels within the current scan window for a third received packet in response to an incomplete reception of the second received packet, and commanding the tuner to listen on the third channel within the current scan window for the third received packet in response to the second received packet having uncorrectable errors.

In one or more embodiments, the method includes correcting the second received packet to create a second advertisement packet in response to the second received packet being received and correctable, decoding the second advertisement packet to generate second advertisement information, and presenting the second advertisement information as second advertisement data.

In one or more embodiments, the method includes correcting the third received packet to create a third advertisement packet in response to the third received packet being received and correctable, decoding the third advertisement packet to generate third advertisement information, and presenting the third advertisement information as third advertisement data.

In one or more embodiments, the method includes listening to the first channel of the plurality of channels in a later scan window in response to the first received packet being unusable in the current scan window.

In one or more embodiments, the method includes listening to the second channel of the plurality of channels in a next scan window in response to the first received packet being decoded during the current scan window.

In one or more embodiments, the method includes listening to the second channel of the plurality of channels in a next scan window where the second received packet was decoded in the current scan window.

In one or more embodiments of the method, in no greater than 500 microseconds after the tuner finishes reception of the first received packet the first received packet is determined to be uncorrectable, and the tuner switches to the second channel to listen for a start of the second received packet within the current scan window.

In one or more embodiments of the method, the first received packet and the second received packet are Bluetooth Low Energy packets.

A vehicle is provided herein. The vehicle includes an antenna, a tuner, an error detection and correction circuit, and a decoder. The antenna is operational to receive a plurality of received packets. The tuner is coupled to the antenna and operational to listen on a first channel of a plurality of channels for a first received packet during a current scan window. The error detection and correction circuit is operational to command the tuner to listen on a second channel of the plurality of channels within the current scan window for a second received packet in response to an incomplete reception of the first received packet, command the tuner to listen on the second channel within the current scan window for the second received packet in response to the first received packet having uncorrectable errors, and correct the first received packet to create a first advertisement packet in response to the first received packet being received and correctable. The decoder is operational to decode the first advertisement packet to generate first advertisement information.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and/or a method that is able to detect a corrupt advertisement packet and still receive advertisement data during a same advertising interval. An advertisement system within a vehicle has a Bluetooth Low Energy tuner generally operating in a scanning mode. The scanning mode listens sequentially to predetermined channels (e.g., channel 37, channel 38, and channel 39) for received packets that convey advertisement data. If an advertisement packet is received on a current channel during a current scan interval, and either there are no cyclic redundancy check (CRC) errors or the CRC errors are correctable, the packet may be decoded. The decoded advertisement data is subsequently presented to people inside the vehicle. The advertisement system may wait until a next scan interval to listen for a next advertisement packet, and channel changes are performed during the current scan interval.

If the advertisement packet is not received during the current scan interval or the advertisement packet is received with sufficient errors that recovery is not possible (e.g., the advertisement packet is unusable), the advertisement packet data is lost. Therefore, the advertisement system quickly selects and changes to a new channel during the current scan interval and attempts to receive a next advertisement packet via the new channel. If there is another unrecoverable CRC error or no packet received for the next advertisement, the scanning device will select and change to yet another channel and scan to receive other advertisement.

Figure 1:
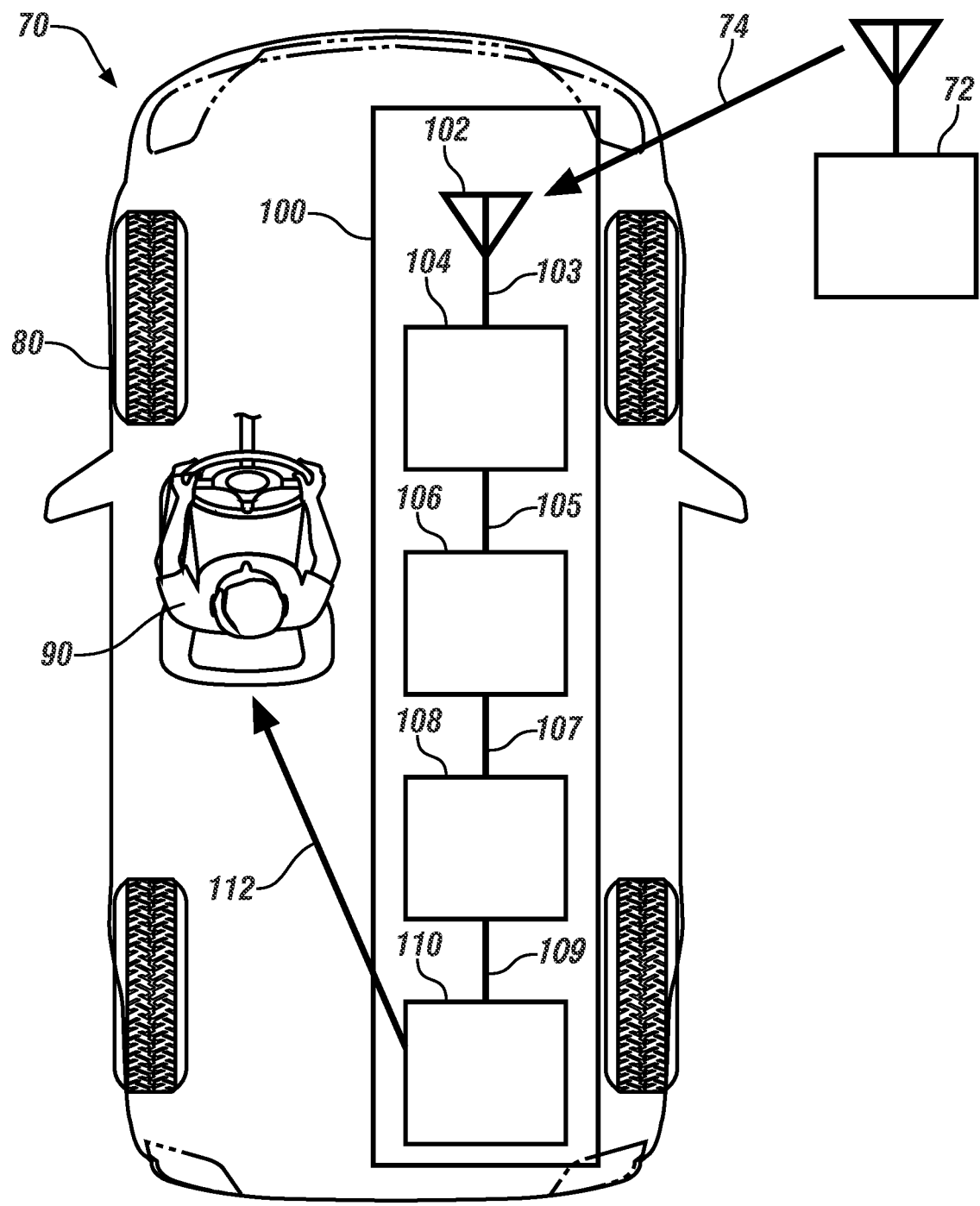
FIG. 1 is a schematic plan diagram of a context of an environment around a vehicle in accordance with one or more exemplary embodiments.

Referring to FIG. 1, a schematic plan diagram of an example context of an environment 70 around a vehicle 80 is shown in accordance with one or more exemplary embodiments. The environment 70 includes one or more advertisers 72 (one shown) and one or more the vehicles 80 (one shown). The vehicle 80 carries one or more occupants 90 and has a built-in advertisement system 100. The advertisement system 100 generally includes an antenna 102, a tuner 104, an error detection and correction circuit 106, a decoder 108, and an output device 110. The advertiser 72 broadcasts transmit packets to the vehicle 80 via wireless communications 74. The output device 110 may present advertisement data 112 to the occupant 90.

The advertiser 72 implements a Bluetooth transmitter. The advertiser 72 is operational to transmit advertisement data in transmitted packets via one or more (e.g., 3) advertisement channels among multiple (e.g., 40) Bluetooth channels carried by the wireless communications 74. The wireless communications 74 may be compliant with the Bluetooth Low Energy (BLE) wireless personal area network technology. For example, a first transmitted packet may convey first advertisement data in a first channel (e.g., channel 37) while the other two advertisement channels are silent. A second transmitted packet may convey second advertisement data in a second channel (e.g., channel 38) while the other two advertisement channels are silent. A third transmitted packet may convey third advertisement data in a third channel (e.g., channel 39) while the other two advertisement channels are silent. The transmitted packets may be sent sequentially in a single scan window. The scan window generally occurs in a single scan interval. The scan interval may be repeated over and over again. The advertisement data transmitted in a given scan interval may be repeated and/or changed in the various scan intervals.

The vehicle 80 implements a gas-powered vehicle, an electric vehicle, a hybrid vehicle, or a plug-in hybrid vehicle. In various embodiments, the vehicle 80 may include, but is not limited to, a passenger vehicle, a truck, an autonomous vehicle, a gas-powered vehicle, an electric-powered vehicle, a hybrid vehicle, a motorcycle, a boat, and/or an aircraft. Other types of vehicles 80 may be implemented to meet the design criteria of a particular application. The vehicle 80 houses (or carries) the advertisement system 100 and components within the advertisement system 100.

The advertisement system 100 implements an advertisement receiver and presentation system. The advertisement system 100 is operational to listen on a first channel of multiple channels of the wireless communications 74 for a first transmitted packet during a current scan window. The advertisement system 100 may listen on a second channel within the current scan window for a second transmitted packet in response to an incomplete reception of the first transmitted packet and/or reception of a first transmitted/received packet having uncorrectable errors. The advertisement system 100 may correct the first received packet, where appropriate, to create a first advertisement packet in response to the first transmitted packet being received and correctable. Thereafter, the advertisement system 100 decodes the first advertisement packet to generate first advertisement data, buffer the first advertisement data, and subsequently present the advertisement data 112 to the occupant 90.

The antenna 102 implements a radio frequency antenna. The antenna 102 is coupled to the tuner 104, and is operational to sense the packets transmitted by the advertiser 72 via the wireless communications 74. The transmitted packets sensed by the antenna 102 may be presented as sensed advertisement packets 103 to the tuner 104.

The tuner 104 implements a Bluetooth Low Energy (BLE) tuner. The tuner 104 is operational to listen to multiple channels in the wireless communications 74, one channel at a time. The current channel being monitored may be controlled by the error detection and correction circuit 106. The advertisement packets acquired by the tuner 104 may be presented as received advertisement packets 105 to the error detection and correction circuit 106

The error detection and correction (EDC) circuit 106 implements a cyclic redundancy check (CRC) error detection and correction circuit. The EDC circuit 106 is operational to accept the received advertisement packets 105 from the tuner 104, check the received advertisement packets 105 for errors, and attempt to correct one or more errors in the received advertisement packets 105 if found. Where a current received advertisement packet 105 is error free or has correctable errors, the EDC circuit 106 may command the tuner 104 to stay on the current channel for a remainder of the current scan interval. Thereafter, the tuner 104 may be commanded to switch to a next channel in the next scan interval. Where a current received advertisement packet 105 is missing or has uncorrectable errors, the EDC circuit 106 may command the tuner 104 to switch to a different channel during the current scan interval. Switching channels may continue until either a received advertisement packet 105 is successfully detected and/or corrected, or each available channel has been scanned. The EDC circuit 106 may present corrected advertisement packets 107 to the decoder 108.

The decoder 108 implements a block decoder. The decoder 108 is operational to decode the corrected advertisement packets 107 provided by the EDC circuit 106 to generate advertisement information 109. The advertisement information 109 is presented to the output device 110.

The output device 110 implements a man machine interface device. The output device 110 is operational to buffer the advertisement information 109, and present the advertisement information 109 as advertisement data 112 to the occupant 90 in a form that the occupant 90 understands. In various embodiments, the output device 110/advertisement data 112 may implement a display/visual data, a speaker/audio data, a haptic device/tough data, or a combination thereof.

Figure 2:
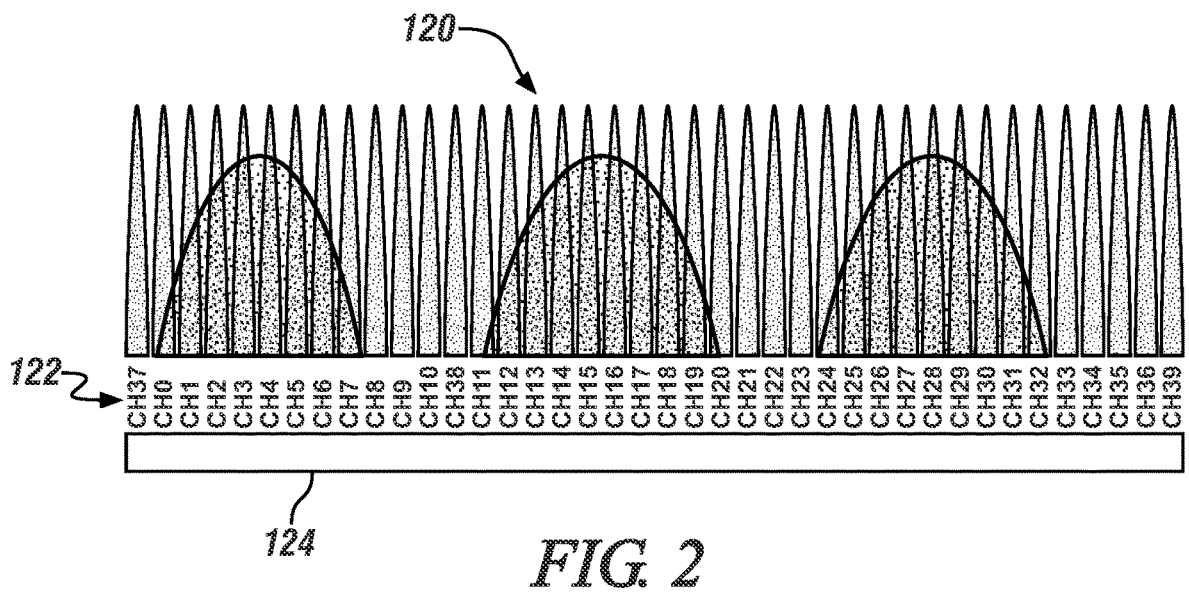
FIG. 2 is a graph of a Bluetooth Low Energy spectrum in accordance with one or more exemplary embodiments.

Referring to FIG. 2, a graph of an example Bluetooth Low Energy spectrum 120 is shown in accordance with one or more exemplary embodiments. The spectrum 120 includes multiple (e.g., 40) channels 122 in a 2.4 gigahertz band 124. The advertisement channels may be channels 37, 38, and 39. The spectrum 120 for Bluetooth extends from 2402 megahertz (MHz) to 2480 MHz, with 1 MHz wide channels, separated by 2 MHz.

The channels 37, 38, and 39 are used for transmitting the advertisement packets. The other channels may be used for other data, and in some cases, additional advertisement packets. During a scan interval, the advertiser 72 transmits the advertisement packets sequentially on the advertising channels, one channel at a time.

While the advertiser 72 is in an advertising mode, advertising packets are sent periodically on each advertising channel. A time interval between the transmitted advertising packets has both a fixed scan interval and a random delay. The fixed interval ranges from approximately 20 milliseconds (ms) to approximately 10.24 seconds, in steps of 0.625 ms. The random delay may be a pseudo-random value from 0 ms to 10 ms. The randomness helps reduce a possibility of collisions between advertisements of different advertisers 72. Where the fixed interval is short (e.g., 20 ms), a quiet period of approximately 500 microseconds or greater may exist between an end of one transmitted advertising packet and a start of a next advertising packet.

Figure 3:
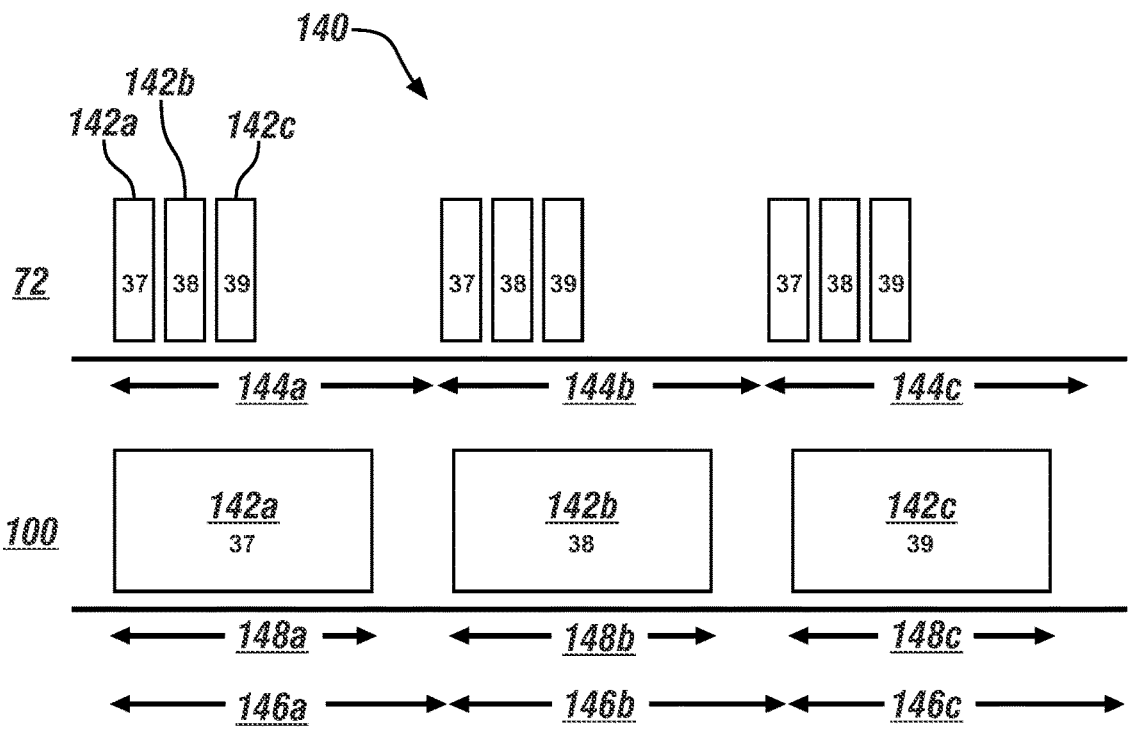
FIG. 3 is a graph of a typical Bluetooth Low Energy broadcast and reception in accordance with one or more exemplary embodiments.

Referring to FIG. 3, a graph of an example implementation of a typical Bluetooth Low Energy broadcast and reception 140 is shown in accordance with one or more exemplary embodiments. Time is illustrated advancing left to right. The advertiser 72 may broadcast advertisement packets in the advertisement channels 142a-142c in a current (or first) advertisement interval (e.g., 144a). The advertisement channels 142a-142c may be used again in a next (or second) advertisement interval (e.g., 144b). The advertisement channels 142a-142c may be used again in a subsequent (or third) advertisement interval (e.g., 144c), and so on.

The advertisement system 100 normally listens to the broadcasts during a scan window 148a-148c within each scan interval 146a-146c. In a current (or first) scan interval/scan window (e.g., 146a/148a), the advertisement system 100 listens on a current (or first) advertisement channel (e.g., 142a or channel 37). In a next (or second) scan interval/scan window (e.g., 146b/148b), the advertisement system 100 listens on a next (or second) advertisement channel (e.g., 142b or channel 38). In a subsequent (or third) scan interval/scan window (e.g., 146c/148c), the advertisement system 100 listens on a subsequent (or third) advertisement channel (e.g., 142c or channel 39). The cycle may repeat in later scan intervals/later scan windows where the advertisement system 100 listens again on the first advertisement channel 142a, then the second advertisement channel 142b, and then the third advertisement channel 142c, and so on.

Figure 4:
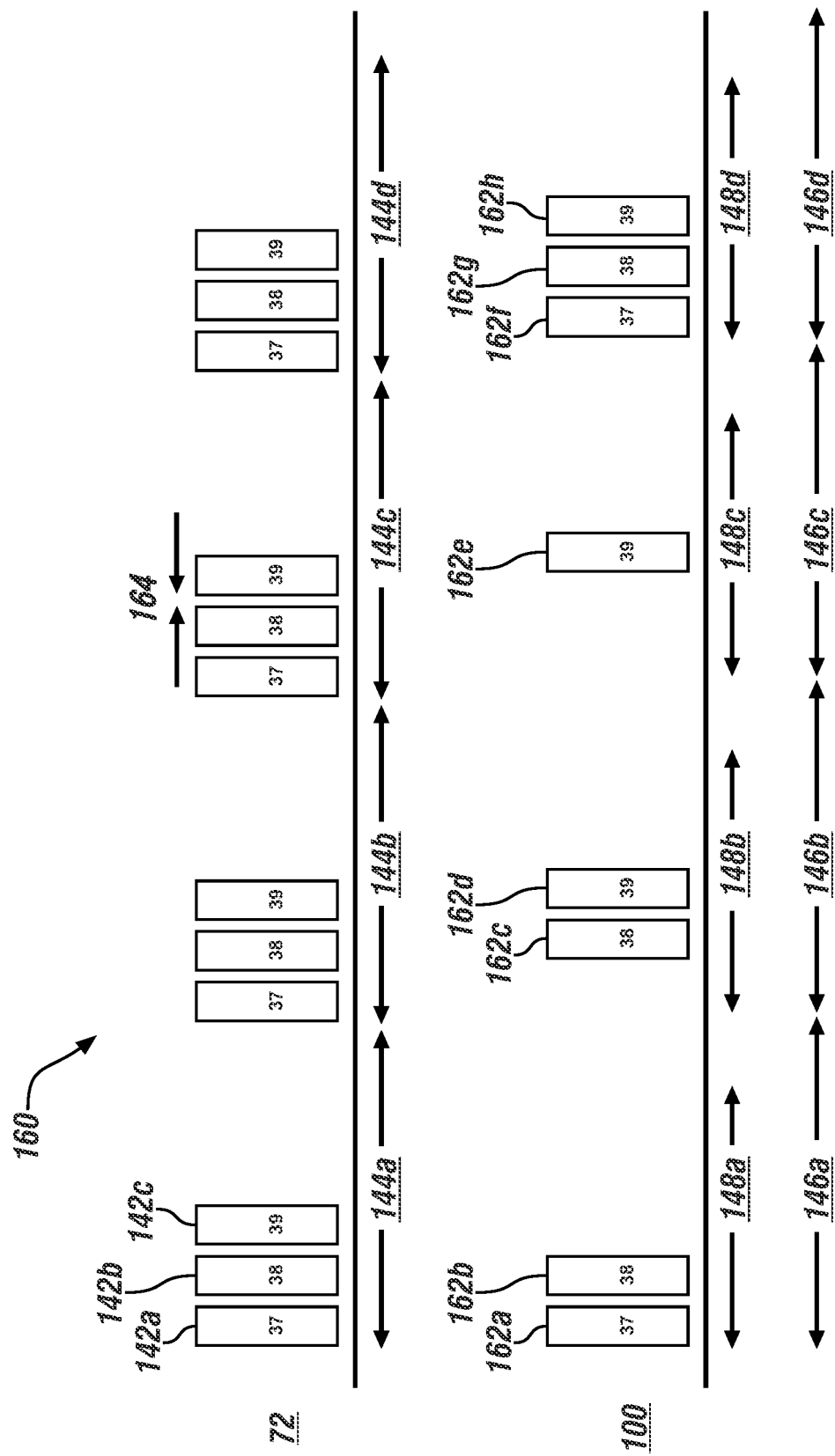
FIG. 4 is a graph of an erroneous Bluetooth Low Energy reception in accordance with one or more exemplary embodiments.

Referring to FIG. 4, a graph of an example implementation of an erroneous Bluetooth Low Energy reception 160 is shown in accordance with one or more exemplary embodiments. Time is illustrated advancing left to right. The advertiser 72 may broadcast the advertisement packets in the advertisement channels 142a-142c within advertisement intervals 144a-144d.

The advertisement system 100 may find a first received advertisement packet 162a in the first advertisement channel 142a during the first scan interval 146a/first scan window

148*a*. In the example, the first received advertisement packet 162*a* has uncorrectable CRC errors. In response to detecting the uncorrectable CRC errors, the EDC circuit 106 instructs the tuner 104 to listen on the second advertisement channel 142*b* during the first scan interval 146*a* for a potentially later-broadcast second advertisement packet. In the example, a second received advertisement packet 162*b* may be received without errors or with correctable errors. As such, the EDC circuit 106 may present the error-free second received advertisement packet 162*b* to the decoder 108. The decoder 108 decodes the second received advertisement packet 162*b* to recover second advertisement information. The output device 110 subsequently presents the second advertisement information as second advertisement data to the occupant 90 while no other advertisements are active inside the vehicle 80.

In the second advertisement interval 144*b*, the advertiser 72 may broadcast advertisement packets in the advertisement channels 142*a*-142*c*. The advertisement system 100 may be listening to the second advertisement channel 142*b* and thus receives the second advertisement packet again during the second scan interval 146*b*/second scan interval 148*b*. If the repeated second advertisement packet 162*c* has uncorrectable CRC errors, the EDC circuit 106 instructs the tuner 104 to listen on the third advertisement channel 142*c* during the second scan interval 146*b* for the later-broadcast third advertisement packet. A third advertisement packet 162*d* may be received with uncorrectable errors or simply not received. As such, no advertisement packets are obtained by the advertisement system 100 during the second scan interval 146*b*.

In the third advertisement interval 144*c*, the advertisement system 100 may be listening to the third advertisement channel 142*c* and thus receives the third advertisement packet during the third scan interval 146*c*/third scan window 148*c*. If the third received advertisement packet 162*e* is error free or has correctable CRC errors, the EDC circuit 106 error corrects the third received advertisement packet 162*e*. The decoder 108 subsequently decodes the third received advertisement packet 162*e* to recover the third advertisement information. At an appropriate time later, the output device 110 presents third advertisement data.

In the fourth (later) advertisement interval 144*d*, the advertisement system 100 may be listening again to the first advertisement channel 142*a* for first advertisement packet during the fourth scan interval 146*d*/fourth scan window 148*d*. If the first advertisement packet 162*f* is uncorrectable or not received, the EDC circuit 106 instructs the tuner 104 to listen to the second advertisement channel 142*b* for the second advertisement packet. Where the second advertisement packet 162*g* is also uncorrectable or not received, the EDC circuit 106 instructs the tuner 104 to listen to the third advertisement channel 142*c* for the third advertisement packet. If the third advertisement packet 162*h* is uscable, the EDC circuit 106, the decoder 108, and the output device 110 extract the third advertisement data for presentation. A delay 164 between finishing one advertisement packet and the start of the next advertisement packet may be approximately 500 microsecond or more.

Figure 5:
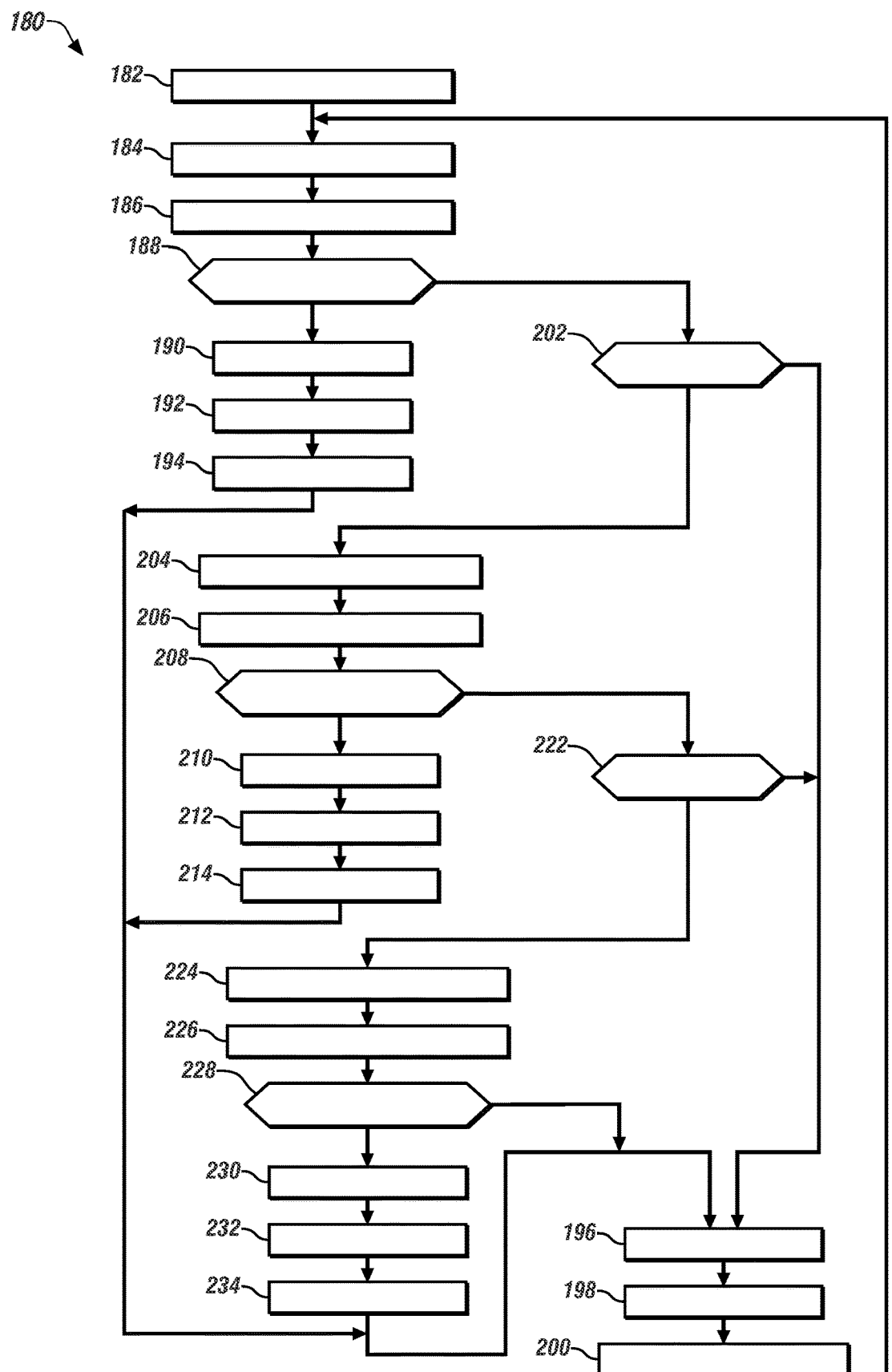
FIG. 5 is a flow diagram of a method for packet recovery in accordance with one or more exemplary embodiments.

Referring to FIG. 5, with references back to FIGS. 1 and 4, a flow diagram of an example method 180 for packet recovery is shown in accordance with one or more exemplary embodiments. The method (or process) 180 is implemented by the advertisement system 100. The example is based on the broadcast of three advertising channels per advertising interval. The method 180 includes steps 182 to 234, as illustrated. The sequence of steps is shown as a representative example. Other step orders may be implemented to meet the criteria of a particular application.

In the step 182, the advertisement system 100 may start a current scan window (e.g., the first scan window 148*a*) in a current scan interval (e.g., the first scan interval 146*a*). The EDC circuit 106 commands the tuner 104 in the step 184 to listen to a current advertisement channel (e.g., the first advertisement channel 142*a*) among the multiple advertisement channels 142*a*-142*c*. The tuner 104 listens on the current advertisement channel for a current received packet during the current scan window in the step 186.

A check is performed by the EDC circuit 106 in the step 188 to determine if the entire current received packet was received. If the current received packet was received (e.g., no errors detected or correctable errors detected), the current received packet is decoded by the EDC circuit 106 to generate current advertisement information in the step 190. In the step 192, the current advertisement information is added to a queue of advertisement information waiting to be presented. In the step 194, the current advertisement information is presented by the output device 110 as current advertisement data to the occupant 90 once the current advertisement information reaches a top of the queue.

The advertisement system 100 waits for a start of a next scan interval and the next scan window in the step 196. When the current scan interval (e.g., 146*a*) ends, the advertisement channel is advanced (e.g., from 142*a* to 142*b*) in the step 198. The scan window is advanced (e.g., 148*a* to 148*b*) in the step 200. Thereafter, the method 180 returns to the step 184 and commands the tuner 104 to listen to the new current advertisement channel (e.g., 142*b*) in the next scan interval (e.g., 146*b*)

In situations where the current received packet is missing or contains uncorrectable errors, a check is performed in the step 202 for more advertisement channels still to be broadcast in the current scan window. If no more advertisement channels remain in the current scan window, the method 180 returns to step 196 and waits for the current scan interval to end. If more current advertisement channels are yet to be broadcast in the current scan window, the EDC circuit 106 may command the tuner 104 to listen on a next advertisement channel within the current scan window for a next received packet in the step 204. In the step 206, the tuner 104 listens on the next channel for the next received packet during the current scan window. Time between the step 188 concluding that the current advertisement packet was not properly received and the step 206 where the tuner 104 starts listening for the next advertisement packet generally occurs within the approximately 500 microsecond delay 164.

A check is performed by the EDC circuit 106 in the step 208 to determine if the entire next received packet was received. If the next received packet was properly received (e.g., no errors detected or correctable errors detected), the next received packet is decoded by the EDC circuit 106 to generate next advertisement information in the step 210. In the step 212, the next advertisement information is added to the queue. In the step 214, the next advertisement information is presented as next advertisement data by the output device 110 to the occupant 90 once the next advertisement information reaches a top of the queue. The method 180 may return to the step 196 and wait for a new scan interval to start.

If the next received packet is missing or contains uncorrectable errors, a check is performed in the step 222 for more advertisement channels still to be broadcast in current scan window. If no more advertisement channels remain in the current scan window, the method 180 returns to step 196 and waits for the current scan interval to end. If more current advertisement channels are yet to be broadcast in the current scan window, the EDC circuit 106 may command the tuner 104 to listen on a subsequent advertisement channel within the current scan window for a subsequent received packet in response to an incomplete reception of the next received packet in the step 224. In the step 226, the tuner 104 listens on the subsequent channel for the subsequent received packet during the current scan window.

A check is performed by the EDC circuit 106 in the step 228 to determine if the entire subsequent received packet was received. If the subsequent received packet was properly received (e.g., no errors detected or correctable errors detected), the subsequent received packet is decoded by the EDC circuit 106 to generate subsequent advertisement data in the step 230. In the step 232, the subsequent advertisement data is added to the queue of advertisement data waiting to be displayed. In the step 234, the subsequent advertisement data is presented by the output device 110 to the occupant 90 upon reaching the top of the queue. The method 180 may return to the step 196 and wait for a new scan interval to start. While the method 180 is illustrated for the broadcast of three advertising channels 142a-142c per advertising interval, fewer or more advertising channels may be accounted for by shrinking or expanding the method 180.

Embodiments of the disclosure provide Bluetooth Low Energy systems and/or methods that may detect CRC errors in one advertising channel and quickly tune to another advertising channel to recover an advertisement packet during a single advertising interval. Current Bluetooth Low Energy advertisements broadcast the three advertising channels in a sequence (e.g. channels 37, 38, and 39) per advertising interval. If the advertising system that is scanning an advertising channel receives a CRC error due to corrupt bit errors, the packet may be discarded. In response to discarding the packet, a next advertising channel is selected by the scanning system.

Embodiments of the system/method allow Bluetooth Low Energy packets to be recovered during the same advertising interval. Scanning multiple channels per advertising interval improves throughput of systems that implement Bluetooth Low Energy. Instead of waiting for the next advertising interval, that introduces a minimum of a 20 ms delay, the system/method allows the detection of bit errors and tries to capture the next packet being transmitted on the next channel.

Embodiments of the disclosure generally provide an advertisement system. A tuner is operational to listen on a first of multiple channel for a first received packet during a current scan window. An error detection and correction circuit is operational to command the tuner to listen on a second channel of the plurality of channels within the current scan window for a second received packet in response to an incomplete reception of the first received packet, command the tuner to listen on the second channel within the current scan window for the second received packet in response to the first received packet having uncorrectable errors, and correct the first received packet to create a first advertisement packet in response to the first received packet being received and correctable. A decoder is operational to decode the first advertisement packet to generate first advertisement data. An output device is operational to present the first advertisement data.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. An advertisement system comprising:
   a tuner operational to listen on a first channel of a plurality of channels for a first received packet during a current scan window;
   an error detection and correction circuit operational to:
      command the tuner to listen on a second channel of the plurality of channels within the current scan window for a second received packet in response to an incomplete reception of the first received packet;
      command the tuner to listen on the second channel within the current scan window for the second received packet in response to the first received packet having uncorrectable errors; and
      correct the first received packet to create a first advertisement packet in response to the first received packet being received and correctable;
   a decoder operational to decode the first advertisement packet to generate first advertisement information; and
   an output device operational to present the first advertisement information as first advertisement data.

2. The advertisement system according to claim 1, wherein the error detection and correction circuit is further operational to:
   command the tuner to listen on a third channel of the plurality of channels within the current scan window for a third received packet in response to an incomplete reception of the second received packet; and
   command the tuner to listen on the third channel within the current scan window for the third received packet in response to the second received packet having uncorrectable errors.

3. The advertisement system according to claim 2, wherein:
   the error detection and correction circuit is further operational to correct the second received packet to create a second advertisement packet in response to the second received packet being received and correctable;
   the decoder is further operational to decode the second advertisement packet to generate second advertisement information; and
   the output device is further operational to present the second advertisement information as second advertisement data.

4. The advertisement system according to claim 2, wherein:
   the error detection and correction circuit is further operational to correct the third received packet to create a third advertisement packet in response to the third received packet being received and correctable;

the decoder is further operational to decode the third advertisement packet to generate third advertisement information; and the output device is further operational to present the third advertisement information as third advertisement data.

5. The advertisement system according to claim 1, wherein the tuner is further operational to:

listen to the first channel of the plurality of channels in a later scan window in response to the first received packet being unusable in the current scan window.

6. The advertisement system according to claim 1, wherein the tuner is further operational to:

listen to the second channel of the plurality of channels in a next scan window in response to the first received packet being decoded during the current scan window.

7. The advertisement system according to claim 1, wherein the tuner is further operational to:

listen to the second channel of the plurality of channels in a next scan window in response to the second received packet being decoded in the current scan window.

8. The advertisement system according to claim 1, wherein in no greater than 500 microseconds after the tuner finishes reception of the first received packet:

the error detection and correction circuit determines that the first received packet is uncorrectable;

the error detection and correction circuit commands the tuner to switch to the second channel; and the tuner switches to the second channel to listen for a start of the second received packet within the current scan window.

9. The advertisement system according to claim 1, wherein the first received packet and the second received packet are Bluetooth Low Energy packets.

10. The advertisement system according to claim 1, further comprising:

an antenna coupled to the tuner and operational to receive a plurality of received packets, wherein the antenna, the tuner, the error detection and correction circuit, the decoder, and the output device form part of a vehicle.

11. A method for packet recovery in an advertisement system comprising:

listening with a tuner on a first channel of a plurality of channels for a first received packet during a current scan window;

commanding the tuner to listen on a second channel of the plurality of channels within the current scan window for a second received packet in response to an incomplete reception of the first received packet;

commanding the tuner to listen on the second channel within the current scan window for the second received packet in response to the first received packet having uncorrectable errors;

correcting the first received packet to create a first advertisement packet in response to the first received packet being received and correctable;

decoding the first advertisement packet to generate first advertisement information; and presenting the first advertisement information as first advertisement data.

12. The method according to claim 11, further comprising:

commanding the tuner to listen on a third channel of the plurality of channels within the current scan window for a third received packet in response to an incomplete reception of the second received packet; and commanding the tuner to listen on the third channel within the current scan window for the third received packet in response to the second received packet having uncorrectable errors.

13. The method according to claim 12, further comprising:

correcting the second received packet to create a second advertisement packet in response to the second received packet being received and correctable;

decoding the second advertisement packet to generate second advertisement information; and presenting the second advertisement information as second advertisement data.

14. The method according to claim 12, further comprising:

correcting the third received packet to create a third advertisement packet in response to the third received packet being received and correctable;

decoding the third advertisement packet to generate third advertisement information; and presenting the third advertisement information as third advertisement data.

15. The method according to claim 11, further comprising:

listening to the first channel of the plurality of channels in a later scan window in response to the first received packet being unusable in the current scan window.

16. The method according to claim 11, further comprising:

listening to the second channel of the plurality of channels in a next scan window in response to the first received packet being decoded during the current scan window.

17. The method according to claim 11 further comprising:

listening to the second channel of the plurality of channels in a next scan window where the second received packet was decoded in the current scan window.

18. The method according to claim 11, wherein in no greater than 500 microseconds after the tuner finishes reception of the first received packet:

the first received packet is determined to be uncorrectable; and the tuner switches to the second channel to listen for a start of the second received packet within the current scan window.

19. The method according to claim 11, wherein the first received packet and the second received packet are Bluetooth Low Energy packets.

20. A vehicle comprising:

an antenna operational to receive a plurality of received packets;

a tuner coupled to the antenna and operational to listen on a first channel of a plurality of channels for a first received packet during a current scan window;

an error detection and correction circuit operational to:

command the tuner to listen on a second channel of the plurality of channels within the current scan window for a second received packet in response to an incomplete reception of the first received packet;

command the tuner to listen on the second channel within the current scan window for the second received packet in response to the first received packet having uncorrectable errors; and correct the first received packet to create a first advertisement packet in response to the first received packet being received and correctable; and a decoder operational to decode the first advertisement packet to generate first advertisement information.

\* \* \* \* \*